(12) United States Patent
Yoshida et al.

(10) Patent No.: US 7,013,659 B2
(45) Date of Patent: Mar. 21, 2006

(54) BATTERY COOLING SYSTEM FOR VEHICLE

(75) Inventors: Makoto Yoshida, Hiroshima (JP); Mitsuyo Oomura, Heikinan (JP); Toshinobu Homan, Obu (JP); Keita Honda, Okazaki (JP); Hiroshi Kishita, Anjo (JP)

(73) Assignee: DENSO Corporation, Kariya (JP)

( * ) Notice: Subject to any disclaimer, the term of this patent is extended or adjusted under 35 U.S.C. 154(b) by 28 days.

(21) Appl. No.: 10/911,881

(22) Filed: Aug. 5, 2004

(65) Prior Publication Data

US 2005/0028542 A1 Feb. 10, 2005

(30) Foreign Application Priority Data

Aug. 5, 2003 (JP) ............................. 2003-287094

(51) Int. Cl.
*F25D 49/00* (2006.01)
(52) U.S. Cl. ..................... 62/186; 62/259.2; 429/62
(58) Field of Classification Search ................ 429/62; 180/68.1, 68.5; 165/41, 202; 454/75; 62/428, 62/411, 408, 259.2, 244, 239, 208, 237, 186
See application file for complete search history.

(56) References Cited

U.S. PATENT DOCUMENTS

| | | | |
|---|---|---|---|
| 5,392,873 A * | 2/1995 | Masuyama et al. | 180/68.5 |
| 5,490,572 A * | 2/1996 | Tajiri et al. | 180/65.1 |
| 5,937,664 A | 8/1999 | Matsuno et al. | |
| 5,982,152 A * | 11/1999 | Watanabe et al. | 320/150 |
| 6,315,069 B1 * | 11/2001 | Suba et al. | 180/68.5 |
| 6,467,286 B1 * | 10/2002 | Hasebe et al. | 62/185 |
| 6,481,230 B1 * | 11/2002 | Kimishima et al. | 62/239 |
| 6,512,347 B1 * | 1/2003 | Hellmann et al. | 320/107 |
| 6,624,615 B1 * | 9/2003 | Park | 320/150 |
| 6,662,891 B1 * | 12/2003 | Misu et al. | 180/68.1 |
| 2002/0102454 A1 * | 8/2002 | Zhou et al. | 429/88 |
| 2003/0118891 A1 * | 6/2003 | Saito et al. | 429/62 |

FOREIGN PATENT DOCUMENTS

JP 2002-191104 A * 7/2002

* cited by examiner

*Primary Examiner*—Mohammad M. Ali
(74) *Attorney, Agent, or Firm*—Harness, Dickey & Pierce, PLC

(57) ABSTRACT

In a battery cooling system that cools a battery by using conditioned air (inside air of a passenger compartment) of a vehicle air conditioner, a battery control unit controls a battery blower to increase an air amount supplied to the battery when a predetermined condition is satisfied. In contrast, an air-conditioning control unit decreases a compression capacity of a compression device after an air amount supplied to the battery is increased to a predetermined amount by the battery control unit. For example, the air-conditioning control unit decreases the compression capacity of the compression device after a predetermined time passes after the air amount supplied to the battery is increased to the predetermined amount. Accordingly, the temperature inside the passenger compartment and the compression device can be stably controlled.

15 Claims, 11 Drawing Sheets

BATTERY COOLING SYSTEM FOR VEHICLE

CROSS REFERENCE TO RELATED APPLICATION

This application is based on Japanese Patent Application No. 2003-287094 filed on Aug. 5, 2003, the disclosure of which is incorporated herein by reference.

FIELD OF THE INVENTION

The present invention relates to a battery cooling system for cooling a battery mounted on a vehicle by using conditioned air of a vehicle air conditioner. More particularly, the present invention is suitably used for cooling a battery that is mounted as a drive source of an electrical motor in an electrical vehicle having the electrical motor for a vehicle running, or a hybrid vehicle having an engine and the electrical motor for the vehicle running.

BACKGROUND OF THE INVENTION

In an electrical vehicle having an electrical motor used for a vehicle running, a battery to be charged is used as a driving source of the electrical motor, and the electrical motor drives the vehicle by the electrical power supplied from the battery. In this electrical vehicle, the battery is charged at a predetermining timing so that it is possible for the vehicle to be continuously run.

However, heat is generated in the battery mounted in the electrical vehicle not only in a charging, but also in a discharging where the electrical power is supplied to the electrical motor. When the temperature of the battery is excessively increased, the performance of the battery is decreased, and the life of the battery is remarkably shortened. In contrast, when the temperature of the battery is excessively decreased, the output of the battery is decreased, and a charging efficiency of the battery is also decreased. Therefore, a cooling and heating device for performing a cooling and a heating of the battery is provided in the electrical vehicle. In this electrical vehicle having the cooling and heating device of the battery, the battery is received in a receiving space, and the receiving space is controlled to be in a predetermined temperature range by the cooling and heating device.

Generally, a passenger compartment is maintained in a temperature range of 20° C.–30° C., and a suitable temperature for suitably using the battery is higher than the interior temperature of the passenger compartment. Thus, in a battery cooling system described in U.S. Pat. No. 5,937,664 (corresponding to JP-A-10-306722), air inside the passenger compartment is introduced into the receiving space of the battery, and a battery cooling is performed by using an air conditioner for performing an air conditioning operation of the passenger compartment. However, in this case, the following problem may be caused.

FIG. 16 is a time chart for explaining the problem in the battery cooling system where the battery mounted in the vehicle is cooled by introducing air inside the passenger compartment. In this battery cooling system, in a case where a blower of the vehicle air conditioner is turned ON, when a target temperature of air to be blown into the passenger compartment is lower than a predetermined temperature and when the air temperature inside the passenger compartment is higher than a predetermined temperature, it is determined that a cool-down operation (i.e., rapid cooling) is required.

In this case, a compressor is operated by a maximum rotation speed (maximum compression capacity) so that cooling capacity of the passenger compartment is increased.

At this time, a cool-down request signal is output as an air-conditioning priority signal to the battery cooling system, and the battery cooling system reduces an air amount blown from a cooling fan to the battery after receiving the cool-down request signal. In contrast, when the cool-down request signal is canceled, the rotation speed of the compressor is decreased, and an air amount blown toward the battery by the cooling fan is increased. However, in this case, a heat load in the passenger compartment is increased again due to the operation of the battery cooling fan, and the air temperature inside the passenger compartment is increased again. As a result, the electrical compressor control and the temperature control inside the passenger compartment become unstable.

SUMMARY OF THE INVENTION

In view of the above-described problems, it is an object of the present invention to provide a battery cooling system for a vehicle, which can stably control an inside air temperature of a passenger compartment and operation of a compressor.

It is another object of the present invention to provide a vehicle apparatus including an air conditioner and a battery cooling system, in which an inside air temperature of the passenger compartment and operation of a compressor can be stably controlled while cooling capacity of the air conditioner and cooling capacity of a battery can be improved.

According to the present invention, a battery cooling system cools a battery mounted on a vehicle by using conditioned air of an air conditioner. The air conditioner includes a compression device having a variable compression capacity for compressing refrigerant, an air conditioning case for defining an air passage through which air flows into a passenger compartment of the vehicle through an air outlet portion, a cooling heat exchanger for cooling air by using refrigerant from the compression device, and an air-conditioning control unit which controls a cooling capacity of the cooling heat exchanger by controlling a compression capacity of the compression device. The battery cooling system includes a battery case for accommodating the battery and having an air supply passage through which air inside the passenger compartment is introduced to be supplied to the battery, a blower disposed in the battery case for blowing air introduced into the air supply passage to the battery, and a battery control unit which controls the blower to increase an air amount supplied to the battery when a predetermined condition is satisfied. Further, the air-conditioning control unit decreases the compression capacity of the compression device after the air amount supplied to the air supply passage of the battery case from the passenger compartment is increased to a predetermined amount. Accordingly, it can restrict the temperature inside the passenger compartment from being rapidly increased again when the air amount supplied to the air supply passage of the battery case from the passenger compartment is increased.

Preferably, the air-conditioning control unit decreases the compression capacity of the compression device after a predetermined time passes after the air amount supplied to the air supply passage of the battery case is increased to the predetermined amount. In this case, even when the air amount blown to the battery is increased, because the compression capacity of the compression device is not reduced for the predetermined time, the cooling capacity of the passenger compartment by the air conditioner is not reduced due to the increased air blowing amount to the battery. As a result, it can restrict the temperature inside the passenger compartment from being increased again, immediately after a cool-down operation of the air conditioner. Therefore, the temperature inside the passenger compartment and the operation of the compressor can be stably controlled.

For example, the predetermined condition is satisfied when a temperature inside the passenger compartment, detected by an inside air temperature detecting unit, is lower than a first predetermined temperature. In this case, the air-conditioning control unit decreases the compression capacity of the compression device when the temperature detected by the inside air temperature detecting unit becomes lower than a second predetermined temperature that is lower than the first predetermined temperature. Accordingly, the temperature inside the passenger compartment and the operation of the compressor can be stably controlled. In contrast, the battery control unit controls the blower to decrease the air amount supplied to the battery when the temperature detected by the inside air temperature detecting unit is higher than the first predetermined temperature.

Alternatively, the predetermined condition is satisfied when a target temperature calculated by a target temperature calculation means is higher than a first predetermined temperature. In this case, the air-conditioning control unit decreases the compression capacity of the compression device when the calculated target temperature is higher than a second predetermined temperature that is higher than the first predetermined temperature. Therefore, the temperature inside the passenger compartment and the operation of the compressor can be accurately controlled. In contrast, the battery control unit controls the blower to decrease the air amount supplied to the battery when the calculated target temperature is lower than the first predetermined temperature.

The present invention can be suitably applied to a vehicle apparatus with the air conditioner and the battery cooling system. In this case, cooling capacity of the passenger compartment and cooling capacity of the battery can be improved while the temperature inside the passenger compartment and the operation of the compressor can be stably controlled.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS (First Embodiment)

Figure 1:
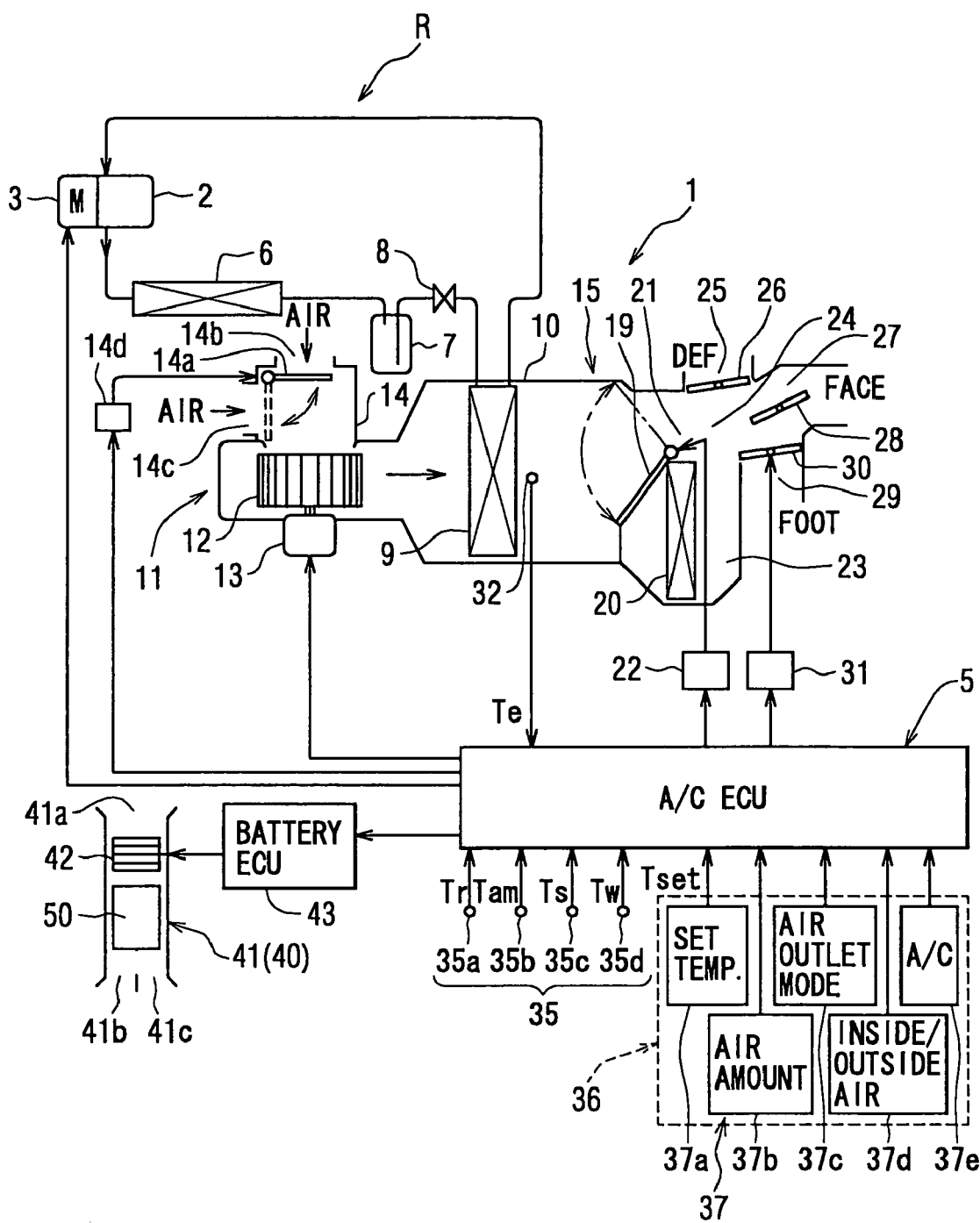
FIG. 1 is a schematic diagram showing an entire structure of a vehicle apparatus with a battery cooling system for a vehicle and a vehicle air conditioner, according to embodiments of the present invention.

The first embodiment of the present invention will be now described with-reference to FIGS. 1–11. As shown in FIG. 1, a vehicle air conditioner 1 includes a refrigerant cycle R that is provided with an electrical compressor 2 for sucking and compressing refrigerant and for discharging the compressed refrigerant. The electrical compressor 2 is integrated with an electrical motor 3 to be operated by electrical power of the electrical motor 3. Therefore, a rotation speed (compression capacity) of the electrical compressor 2 is changed by changing the rotation speed of the electrical motor 3. The rotation speed of the electrical motor 3 is controlled by an air conditioning ECU 5 so as to control the compression capacity (cooling capacity) of the electrical compressor 2.

High-temperature and high-pressure gas refrigerant discharged from the electrical compressor 2 flows into a condenser 6 (high-pressure heat exchanger, refrigerant radiator), and is heat-exchanged with cooling air (i.e., outside air). The refrigerant cooled and condensed in the condenser 6 flows into a receiver 7, and is separated into gas refrigerant and liquid refrigerant within the receiver 7. Surplus refrigerant (liquid refrigerant) of the refrigerant cycle R is stored in the receiver 7.

The liquid refrigerant from the receiver 7 is decompressed by an expansion valve (decompression device) 8 to be in a gas-liquid two-phase state. Then, low-pressure refrigerant from the expansion valve 8 flows into an evaporator (cooling heat exchanger) 9 to be evaporated. The evaporator 9 is disposed in an air conditioning case 10 of the vehicle air conditioner 1. The air conditioning case 10 is provided to define therein an air passage through which air flows into the passenger compartment. Generally, low-pressure refrigerant flowing into the evaporator 9 is evaporated by absorbing heat from air in the air conditioning case 10, so that air passing through the evaporator 9 is cooled. A refrigerant outlet of the evaporator 9 is connected to a refrigerant suction side of the electrical compressor 2, so that a closed refrigerant cycle is constructed. In this embodiment, the cooling capacity of the evaporator 9 for cooling air can be controlled by controlling the compression capacity of the compressor 2.

A blower 11 is disposed in the air conditioning case 10 upstream from the evaporator 9 in an air flow direction. The blower 11 includes a centrifugal fan 12 for blowing air, and a blower motor 13 for driving the centrifugal fan 12. An inside/outside air switching box 14 is disposed at an air suction side of the blower fan 12. The inside/outside air switching box 14 has an outside air introduction port 14b and an inside air introduction port 14c which are selectively opened and closed by an inside/outside air switching door 14a disposed within the inside/outside air switching box 14. Inside air (i.e., air inside a passenger compartment) is introduced from the inside air introduction port 14c, and outside air (i.e., air outside the passenger compartment) is introduced from the outside air introduction port 14d. The inside/outside air switching door 14a is driven by a servomotor 14d.

A ventilation system of the vehicle air conditioner 1 is constructed with the blower 11 and an air conditioning unit 15 that is arranged downstream of the blower 11. Generally, the air conditioning unit 15 is disposed inside a dashboard on a front side in the passenger, compartment, at an approximate center position in a vehicle width direction (i.e., vehicle right-left direction). In contrast, the blower 11 is disposed at a position offset from the air conditioning unit 15 in the vehicle width direction.

An air mixing door (A/M) 19 is disposed in the air conditioning case 10 at a downstream air side of the evaporator 9, and a hot-water type heater core (heating heat exchanger) 20 for heating air is disposed in the air conditioning case 10 at a downstream air side of the air mixing door 19. The heater core 20 heats air passing therethrough by using hot water (engine-cooling water) from a vehicle engine as a heat source. The heater core 20 is arranged within the air conditioning case 10 at a lower side so as to form a bypass passage 21 at an upper side within the air conditioning case 10. Therefore, air from the evaporator 9 flows through the bypass passage 21 while bypassing the heater core 20.

The air mixing door 19 is disposed in the air conditioning case 10 to adjust a flow ratio between an air amount passing through the heater core 20 and an air amount passing through the bypass passage 21, so that temperature of air to be blown into the passenger compartment can be adjusted. In this embodiment, the air mixing door 19 is a temperature adjustment unit for adjusting temperature of air to be blown into the passenger compartment. The air mixing door 19 is driven by a servomotor 22.

A warm air passage 23 extending from a downstream side of the heater core 20 to an upper side in the air conditioning case 20 is formed. Therefore, in the air conditioning case 20, warm air from the warm air passage 23 and cool air from the bypass passage 21 are mixed in an air mixing portion 24 so that conditioned air having a predetermined temperature is obtained. An air-outlet mode switching portion is disposed in the air conditioning case 10 at a downstream air side of the air mixing portion 24.

Specifically, a defroster opening 25 is formed in an upper portion of the air conditioning case 10, so that conditioned air is blown toward an inner surface of a vehicle windshield through a defroster duct. The defroster opening 25 is opened and closed by a rotatable plate-like defroster door 26. A face opening 27 is formed in the upper portion of the air conditioning case 10 at a vehicle rear side position from the defroster opening 25, so that conditioned air is blown toward an upper portion of a passenger in the passenger compartment through a face duct. The face opening 27 is opened and closed by a rotatable plate-like face door 28. Further, a foot opening 29 is formed at a lower side position of the air conditioning case 10, so that conditioned air is blown toward a foot portion of the passenger in the passenger compartment through a foot duct. The foot opening 29 is opened and closed by a rotatable plate-like foot door 30.

Mode switching doors such as the defroster door 26, the face door 28 and the foot door 30 are connected to a common link mechanism (not shown), and are driven by a servomotor 31.

Figure 2:
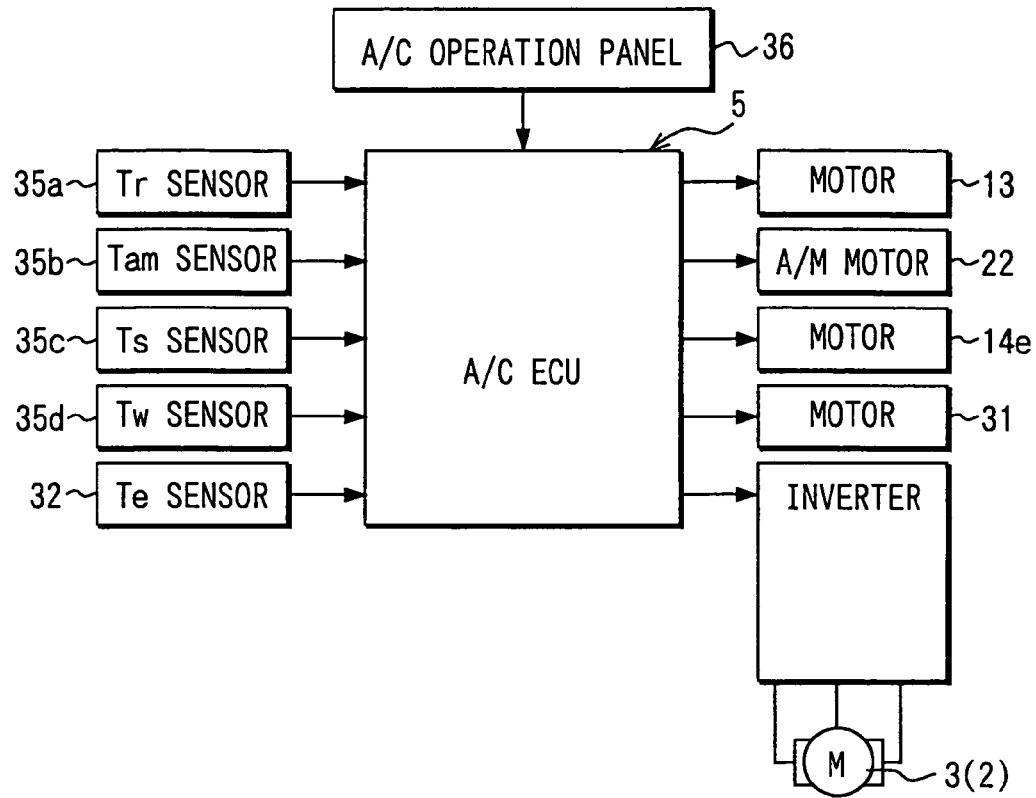
FIG. 2 is a block diagram showing a control system in the vehicle air conditioner of FIG. 1.

Next, an electrical control portion according to the first embodiment will be now described with reference to FIGS. 1 and 2. FIG. 2 shows a control system of the vehicle air conditioner 1. A temperature sensor 35a is provided as an inside air temperature detecting unit for detecting an inside air temperature Tr of the passenger compartment, and a temperature sensor 35b is provided as an outside air temperature detecting unit for detecting an outside air temperature Tam. Further, a post-evaporator temperature sensor 32 is provided to detect a temperature Te (post-evaporator temperature) of air immediately after passing through the evaporator 9.

Further, a solar radiation sensor 35c is provided to detect a solar radiation Ts entering into the passenger compartment, and a water temperature sensor 35d is provided to detect a water temperature Tw flowing into the heater core 20. Signals from a sensor group 35 including the sensors 35a–35d are input to the air conditioning ECU 5. The air conditioning ECU 5 calculates a target temperature TAO of air to be blown into the passenger compartment by using the signals from the sensor group 35 and a set temperature Tset (desired temperature). An air-conditioning operation panel 36 is arranged at a position around an instrument panel in the passenger compartment, and has an operation switch group 37 which can be manually operated by a passenger. Operation signals from the operation switch group 37 are also input to the air conditioning ECU 5. The air conditioning ECU 5 performs an input process of a panel switch and a display process to be displayed on an air-conditioning operation panel 36, in accordance with the input operation signals.

The operation switch group 37 includes a temperature setting switch 37a for setting the set temperature (desired temperature) Tset, an air amount setting switch 37b for setting an air amount to be blown into the passenger compartment, an air-outlet mode selecting switch 37c for setting an air outlet mode, and an inside/outside air selecting switch 37d for selecting an air introduction mode, and an air conditioning switch 37e for turning on or off the electrical compressor 2. For example, by the air-outlet mode switch 37c, one of a face mode, a bi-level mode, a foot mode, a foot/defroster mode and a defroster mode can be manually selected. Further, by the inside/outside air selecting switch 37d, one of an inside air introduction mode, an outside air introduction mode and an inside/outside air mixing mode can be manually selected.

The air conditioning ECU 5 is constructed with a microcomputer and connection circuits. The microcomputer is constructed with CPU, ROM and RAM. The air conditioning ECU 5 calculates a target post-evaporator temperature TEO, and controls the electrical motor 3 through an inverter.

Further, the air conditioning ECU 5 includes: an air-introduction mode control portion that calculates an air introduction mode position and controls the motor 14*e* for driving the inside/outside air switching door 14*a*; an air amount control portion that calculates an air blowing amount and controls the blower motor 13; the air mixing control portion that controls an air mixing motor 22 for driving the air mixing door 19; and an air-outlet mode control portion that calculates an air outlet mode position and controls the servomotor motor 31.

Figure 3:
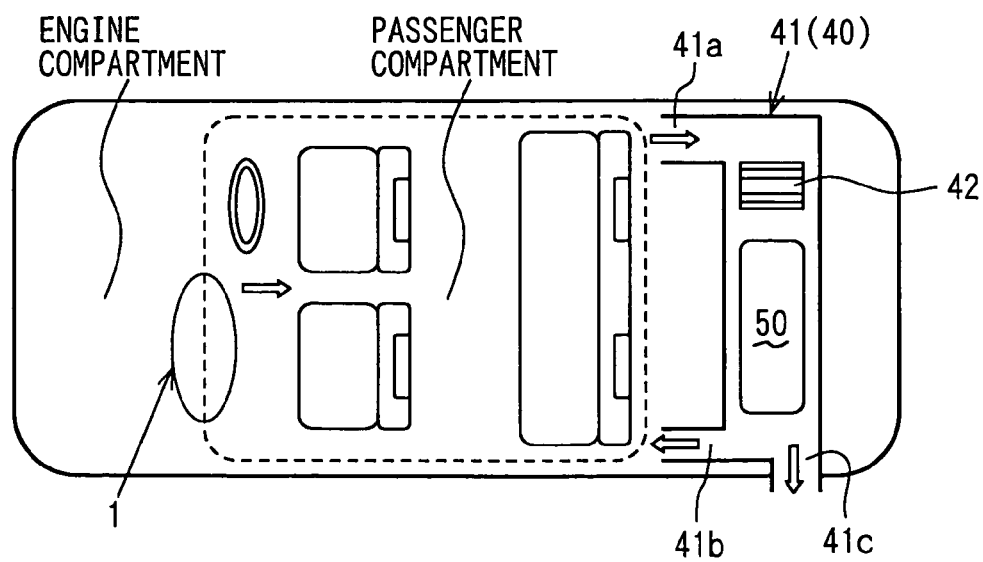
FIG. 3 is a schematic plan view showing arrangement positions of the vehicle air conditioner and the battery cooling system according to embodiments of the present invention.

Next, the structure of a battery cooling system 40 will be now described. FIG. 3 is a plan view of the vehicle, showing arrangement positions of the vehicle air conditioner 1 and the battery cooling system 40. In this embodiment, the vehicle is a hybrid vehicle having the engine and an electrical motor that are used as a driving source for a vehicle running. However, the present invention can be applied to an electrical vehicle driven by the electrical motor, only when a battery 50 is provided for driving the electrical motor.

The battery 50 for driving the electrical motor is disposed in a casing 41, and is mounted on the vehicle, as shown in FIG. 3. The battery cooling system 40 for cooling the battery 50 is arranged in a space between a rear seat back and a trunk room. The battery cooling system 40 is provided to effectively supply air inside the passenger compartment into the casing 41, without affecting the air conditioning operation.

The battery cooling system 40 includes the casing 41 for accommodating the battery 50, a cool air supply duct 41*a* for supplying inside air of the passenger compartment into the casing 41, and a battery cooling fan 42 for blowing air in the casing 41. The battery cooling fan 42 is provided to draw the inside air of the passenger compartment and to supply the drawn inside air to the battery 50 in the casing 41. Here, the inside air of the passenger compartment is used as cooling air in the battery cooling system 40.

Further, the battery cooling system 40 includes a cooling air circulation duct 41*b* through which a part of air after cooling the battery 50 returns to the passenger compartment, and a cooling air discharge duct 41*c* through which air after cooling the battery 50 is discharged to an exterior of the passenger compartment. In the battery cooling system 40 of the first embodiment, all air after cooling the battery 50 can be circulated to the passenger compartment through the cooling air circulation duct 41*b*, or all air after cooling the battery 50 can be discharged to the exterior of the passenger compartment through the cooling air discharge duct 41*c*. That is, it is possible to provide one of the cooling air circulation duct 41*b* and the cooling air discharge duct 41*c* in the battery casing 41. Further, it is possible to suitably adjust a flow ratio between an air amount passing through the cooling air circulation duct 41*b* and an air amount passing through the cooling air discharge duct 41*c*. In the first embodiment, an inlet port of the cooling air supply duct 41*a* and an outlet port of the cooling air circulation duct 41*b* are opened at two sides of the rear seat, and an outlet port of the cooling air discharge duct 41*c* is opened on a back side of a rear bumper.

The battery cooling system 40 is provided with a battery cooling control unit (Battery cooling ECU) 43 for controlling the battery cooling fan 42. A battery temperature sensor (not shown) for detecting a battery temperature, and a cooling air temperature sensor for detecting temperature of cooling air (inside air) introduced into the cooling air supply duct 41*a* are connected to the battery cooling control unit 43. The battery cooling control unit 43 controls the temperature of the battery 50 to be in a suitable range based on signals from the battery temperature sensor and the cooling air temperature sensor. In addition, the battery cooling control unit 43 is connected to the air conditioning ECU 5 to communicate with the air conditioning ECU 5. For example, a cool-down request signal is output from the air conditioning ECU 5 to the battery cooling control unit 43 when the cool-down operation needs in the vehicle air conditioner 1.

Figure 4:
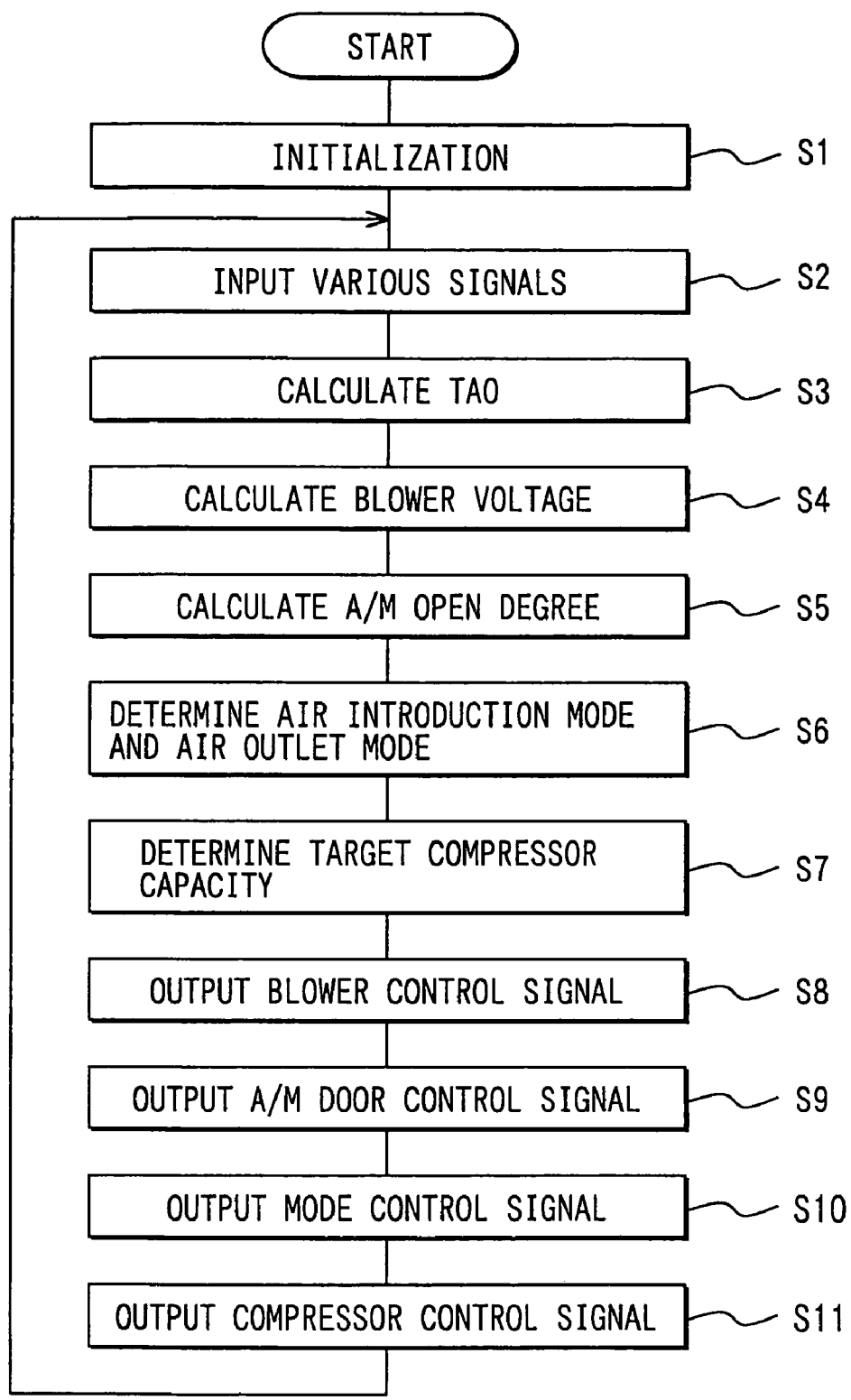
FIG. 4 is a flow diagram showing a general control process of an air conditioning ECU according to a first embodiment of the present invention.

FIG. 4 shows a control operation of the vehicle air conditioner 1, performed by the air conditioning ECU 5. First, when an ignition switch is turned ON, electrical power is supplied to the air conditioning ECU 5. Then, the air conditioning ECU 5 performs the control operation in accordance with a control program stored beforehand in the ROM. At this time, an initialization of date in the RAM is performed at step S1. Next, at step S2, various signals such as switch signals from the operation switch group 37 on the air-conditioning operation panel 36 and sensor signals from the sensor group 35 are input.

Specifically, the inside air temperature Tr detected by the inside air temperature sensor 35*a*, the outside air temperature Tam detected by the outside air temperature sensor 35*b*, the solar radiation amount Ts detected by the solar radiation sensor 35*c*, the post-evaporator temperature Te detected by the post-evaporator temperature sensor 32, the water temperature Tw detected by the water temperature sensor 35*d* are input as the sensor signals.

Next, at step S3, a target temperature TAO of air to be blown into the passenger compartment is calculated in accordance with formula 1 by using input signals.

$$TAO = KSET \times Tset - KR \times Tr - KAM \times Tam - KS \times Ts + C \quad \text{(formula 1)}$$

In this formula 1, Tset is the desirable temperature (set temperature) and Tr is the inside air temperature, Tam is the outside air temperature and Ts is the solar radiation amount. KSET, KR, KAM and KS are respectively coefficients and C is a constant.

Figure 5:
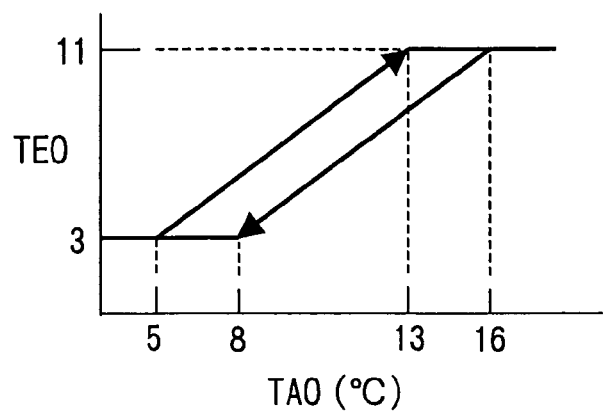
FIG. 5 is a graph for determining a target post-evaporator air temperature TEO in the control program shown in FIG. 4.
Figure 6:
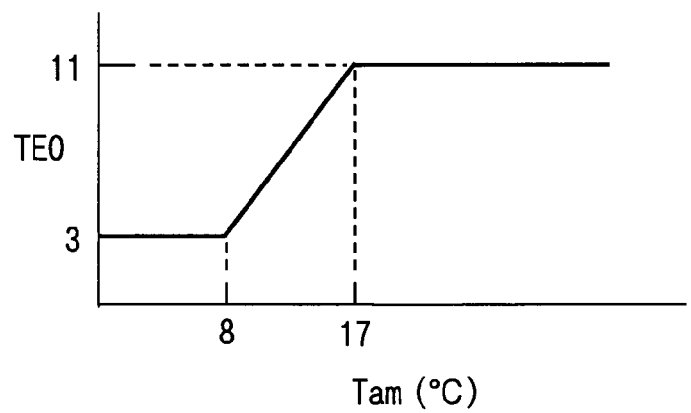
FIG. 6 is another graph for determining a target post-evaporator air temperature TEO in the control program shown in FIG. 4.

Then, a target post-evaporator temperature TEO of air blown from the evaporator 9 is calculated by using the calculated target temperature TAO and the detected outside air temperature Tam in accordance with the graphs shown in FIGS. 5 and 6. Specifically, a first target post-evaporator temperature TEO1 is calculated by using the calculated target temperature TAO in accordance with the graph in FIG. 5, and a second target post-evaporator temperature TEO2 is calculated by using the detected outside air temperature Tam in accordance with the graph in FIG. 6. Then, a small one among the first target post-evaporator temperature TEO1 and the second target post-evaporator temperature TEO2 is used as the target post-evaporator temperature TEO.

Figure 7:
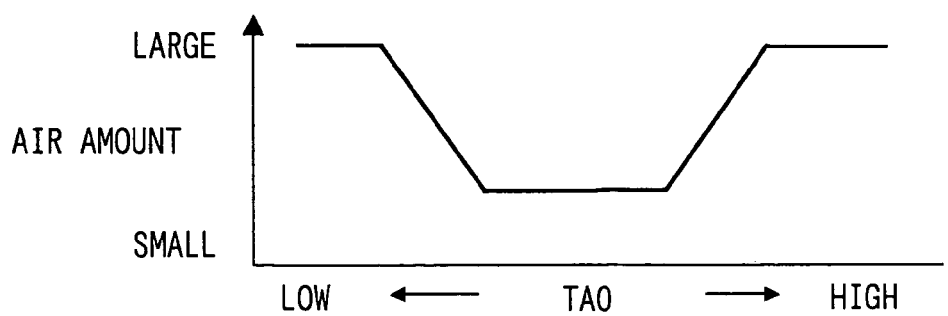
FIG. 7 is a graph for determining an air amount blown by a blower of the vehicle air conditioner in the control program shown in FIG. 4.

Next, at step S4, an air blowing amount of the blower 11, that is, a blower voltage VA applied to the blower motor 31 is calculated based on the target temperature TAO calculated at step S3, in accordance with the graph shown in FIG. 7. At step S5, an opening degree SW of the air mixing door 19 is calculated in accordance with formula 2.

$$SW(\%) = (TAO - Te)/(Tw - Te) \times 100 \, (\%) \quad \text{(formula 2)}$$

Figure 8:
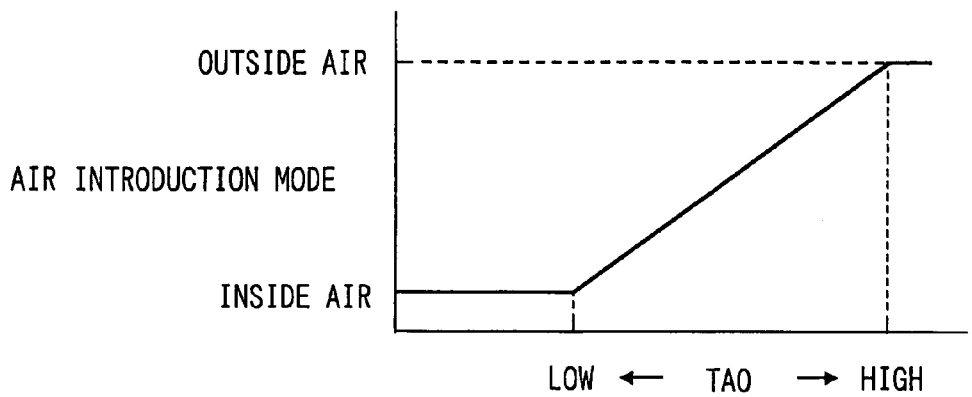
FIG. 8 is a graph for determining an air introduction mode in the control program shown in FIG. 4.
Figure 9:
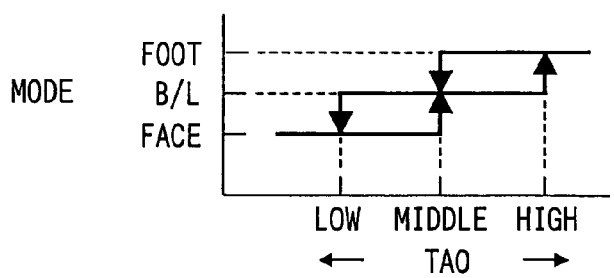
FIG. 9 is a graph for determining an air outlet mode in the control program shown in FIG. 4.

Then, at step S6, an air introduction mode is determined based on the target temperature TAO in accordance with the graph of FIG. 8, and an air outlet mode is determined based on the target temperature TAO in accordance with the graph of FIG. 9.

At step S7, a target capacity (target rotation speed) of the electrical compressor 2 is determined by performing a feedback control (PI control) so that an actual post-evaporator temperature Te detected by the post-evaporator sensor 32 corresponds to the determined target post-evaporator temperature TEO. That is, a target discharge amount of refrigerant discharged from the electrical compressor 2 is determined at step S7.

Then, at step S8, a blower control signal is output to the air amount control portion so that the blower control current VA determined at step S4 is obtained. At step S9, an air mixing door control signal is output to the servomotor 22 so that the air mixing degree SW determined at step S5 can be obtained. At step S10, mode control signals are output to the servomotors 14e, 31 so that the air introduction mode and the air outlet mode determined at step S6 are set. Further, at step S11, the control current determined at step S7 is output to the inverter provided in the electrical compressor 2. Thereafter, the control program returns to step S2.

Figure 10:
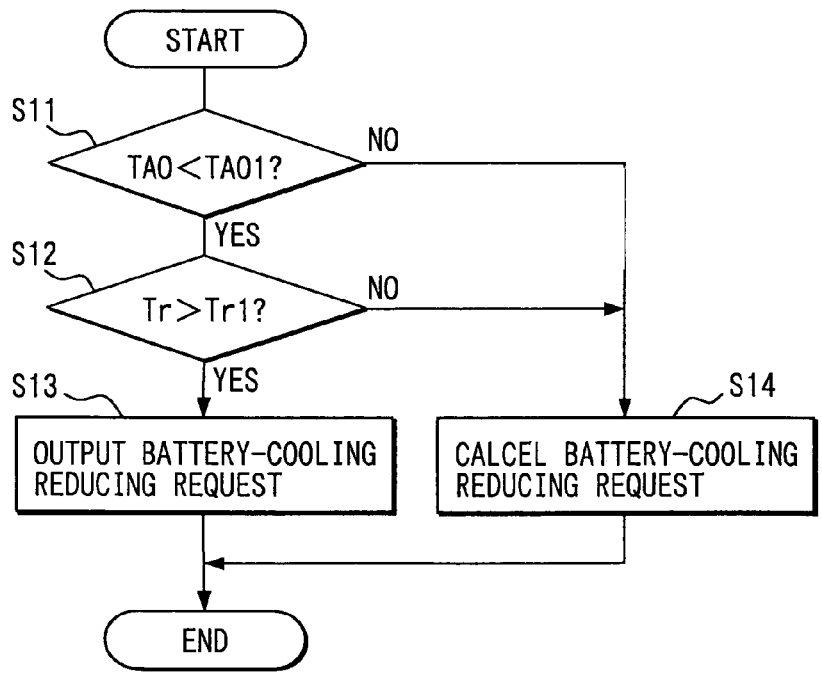
FIG. 10 is a flow diagram showing an air-conditioning preference control performed in the air conditioning ECU, according to the first embodiment.

FIG. 10 is a flow diagram showing an air-conditioning preference control performed in the control system. In this embodiment, inside air (conditioned air) of the passenger compartment is introduced into a battery casing 41 to cool the battery 50. Further, a part of air after cooling the battery 50 is circulated into the passenger compartment, and the other part of air after cooling the battery 50 is discharged to the exterior of the passenger compartment.

As shown in FIG. 10, when the target temperature TAO of air to be blown into the passenger compartment is lower than a first predetermined target temperature TAO1 at step S11, and when the inside air temperature Tr detected by the inside air temperature sensor 35a is higher than a first predetermined inside air temperature Tr1 at step S12, it is determined that air conditioning load (cooling load) is high. In this case, at step S13, a battery-cooling reducing request is output to the battery cooling control unit 43 so that an air amount blown by the cooling fan 42 is reduced. That is, at step S13, the air-conditioning preference control is performed in the vehicle air conditioner 1 when the air conditioning load of the passenger compartment is high.

In contrast, when the target temperature TAO of air to be blown into the passenger compartment is equal to or higher than the first predetermined target temperature TAO1 at step S11, or when the inside air temperature Tr is equal to or lower than the first predetermined inside air temperature Tr1, the battery-cooling reducing request is not output to the battery cooling control unit 43 at step S14. That is, when the target temperature TAO of air to be blown into the passenger compartment is equal to or higher than the first predetermined target temperature TAO1 or when the inside air temperature Tr is equal to or lower than the first predetermined inside air temperature Tr1, it is determined that a predetermined condition is satisfied. When the predetermined condition is satisfied, the battery-cooling reducing request is canceled, and cooling air (i.e., inside air) is blown to the battery 50.

Figure 11:
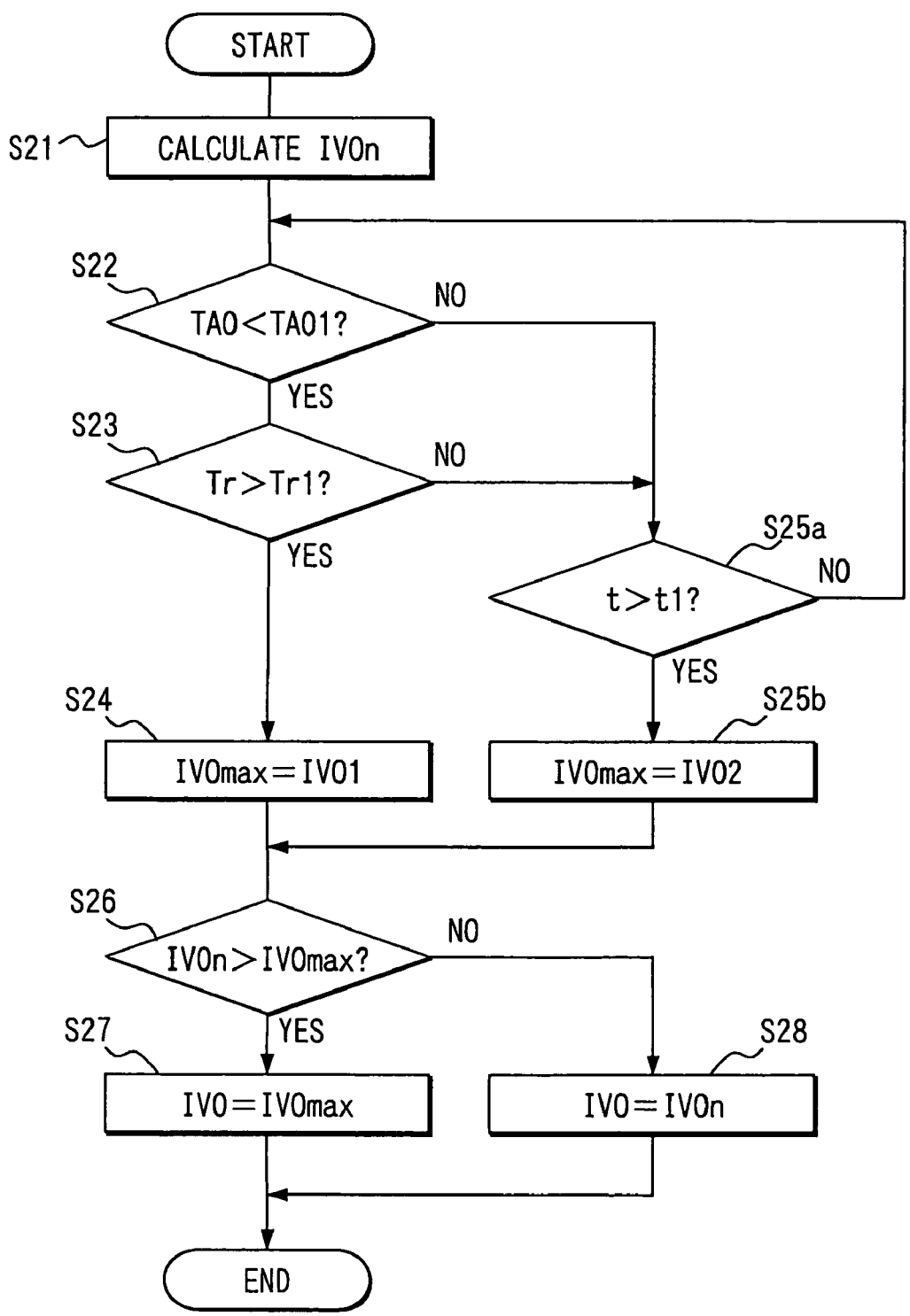
FIG. 11 is a flow diagram showing an electrical compressor control according to the first embodiment.

Next, control operation of the electrical compressor 2 will be now described with reference to FIG. 11. The fuzzy feedback control of the electrical compressor 2 is performed, and the rotation speed of the electrical compressor 2 is controlled by the air conditioning ECU 5, so that the post-evaporator temperature Te becomes the target post-evaporator temperature TEO. Specifically, at step S21, a present target rotation speed IVOn is calculated in accordance with the fuzzy feedback control by using the detected post-evaporator temperature Te and the target post-evaporator temperature TEO, and the rotation speed of the compressor 2 is changed through the inverter by the air-conditioning ECU 5.

Then, the air conditioning load is determined by using the target air temperature TAO and the inside air temperature Tr, and an upper limit of the rotation speed (compression capacity) of the electrical compressor 2 is determined. Specifically, when the target temperature TAO of air to be blown into the passenger compartment is lower than the first predetermined target temperature TAO1 at step S22, and when the inside air temperature Tr detected by the inside air temperature sensor 35a is higher than the first predetermined inside air temperature Tr1 at step S23, it is determined that air conditioning load (cooling load) is high. In this case, at step S24, the upper limit rotation speed IVOmax of the electrical compressor 2 is increased to a first predetermined value IVO1, so that cooling capacity is increased.

In contrast, when the target temperature TAO of air to be blown into the passenger compartment is equal to or higher than the first predetermined target temperature TAO1 at step S22, or when the inside air temperature Tr is equal to or lower than the first predetermined inside air temperature Tr1 at step S23, it is determined that the air conditioning load (cooling load) is low. In this case, at step S25a, it is determined whether or not a predetermined time t1 passes after the predetermined condition where TAO≧TAO1 or Tr≦Tr1 is satisfied. When the predetermined time t1 passes after the predetermined condition is satisfied, the upper limit rotation speed IVOmax of the electrical compressor 2 is set at a second predetermined value IVO2 that is lower than the first predetermined value IVO1, so that the cooling capacity is reduced.

Next, at step S26, the present target rotation speed IVOn calculated at step S21 is compared with the upper limit rotation speed IVOmax determined at step S24 or S25. When it is determined that the upper limit rotation speed IVOmax determined at step S24 or S25 is smaller than the present target rotation speed IVOn at step S26, the target rotation speed IVO is set at the upper limit rotation speed IVOmax (i.e., IVO=IVOmax) at step S27. In contrast, when it is determined that the upper limit rotation speed IVOmax determined at step S24 or S25 is larger than the present target rotation speed IVOn at step S26, the target rotation speed IVO is set at the present rotation speed IVOn (i.e., IVO=IVOn) at step S28. That is, a smaller one among the upper limit rotation speed IVOmax and the present rotation speed IVOn is finally set as the target rotation speed IVO.

According to the first embodiment of the present invention, after the predetermined time t1 passes after the predetermined condition is satisfied, the compression capacity (compression capacity, rotation speed) of the electrical compressor 2 is decreased. Accordingly, even when the air amount of the battery cooling fan 42 is increased after the predetermined condition is satisfied, the electrical compressor 2 can be operated by a high capacity for the predetermined time t1, so that the battery cooling capacity can be effectively increased in accordance with the thermal load of the battery. Then, after the predetermined time t1 passes after the predetermined condition is satisfied, the compression capacity of the electrical compressor 2 is decreased. Thus, in a case where the air amount of the battery cooling fan 42 is increased in accordance with the cancel of the battery-cooling reducing request, that is, even in a case immediately after the cool-down control, it can restrict the inside air temperature Tr from being increased again, and it is possible to stably control the inside air temperature Tr and the operation of the electrical compressor 2.

(Second Embodiment)

Figure 12:
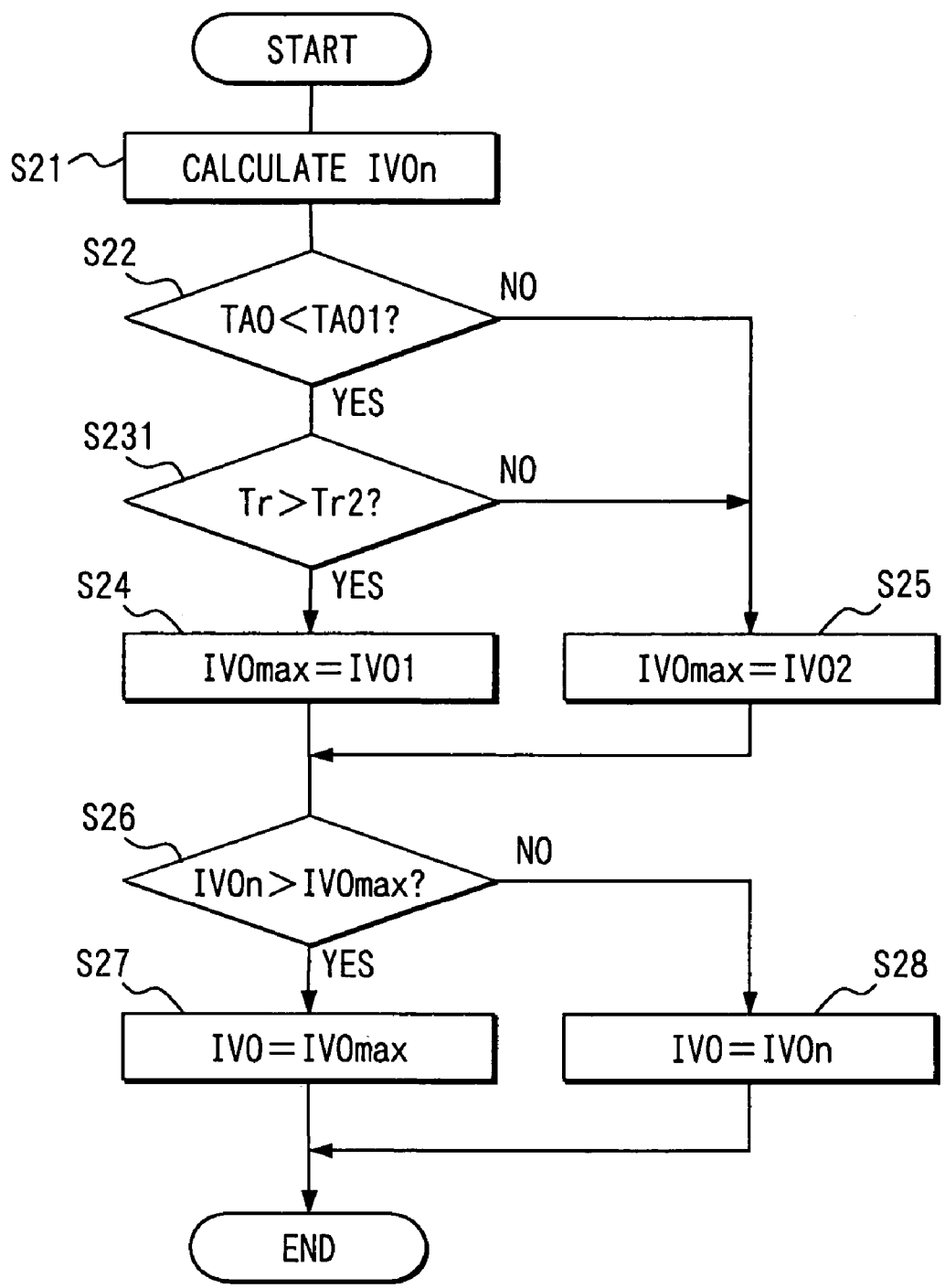
FIG. 12 is a flow diagram showing an electrical compressor control according to a second embodiment of the present invention.

The second embodiment of the present invention will be now described with reference to FIG. 12. In the above-described first embodiment, the inside air temperature Tr is compared with the first predetermined inside air temperature at step S23, and the upper limit rotation speed IVOmax is decreased to the second predetermined value. IVO2 at step S25b after the predetermined time t1 passes after the air amount to be blown to the battery 50 is increased. However, in the second embodiment, at step S231 in FIG. 12, it is determined whether or not the inside air temperature Tr is larger than a second predetermined inside air temperature Tr2 that is lower than the first predetermined inside air temperature Tr1. Further, at step S25 in FIG. 12, when the target air temperature TAO is equal to or higher than the first predetermined target temperature TAO1 or when the inside air temperature Tr is equal to or lower than the second predetermined inside air temperature Tr2, the upper limit rotation speed IVOmax is decreased without waiting the predetermined time t1. In the second embodiment, the other parts are similar to those of the above-described first embodiment.

As described in FIG. 10 of the first embodiment, when the predetermined condition where the target temperature. TAO is not lower than the first predetermined target temperature TAO1 or the inside air temperature Tr is not higher than the first predetermined inside air temperature Tr1, the battery-cooling reducing request is canceled and the air amount to be blown to the battery 50 is increased. However, in the second embodiment, even when the inside air temperature Tr is equal to or lower than the first predetermined inside air temperature Tr1, the upper limit rotation speed is not reduced to the second predetermined valve IVO2 that is smaller than the first predetermined valve IVO1. When the inside air temperature Tr is equal to or lower than the second predetermined inside air temperature Tr2 that is lower than the first predetermined inside air temperature Tr1 at step S231, the upper limit rotation speed is reduced to the second predetermined valve IVO2 so that the compression capacity of the compressor 2 is reduced and the cooling capacity of the evaporator 9 is reduced.

Accordingly, even when the air blowing amount to the battery 50 is increased in the predetermined condition where the inside air temperature Tr is equal to or lower than the first predetermined inside air temperature Tr1, the upper limit rotation speed of the compressor 2 is not reduced to the second predetermined valve IVO2 until the inside air temperature Tr is reduced to the second predetermined inside air temperature Tr2 that is lower than the first predetermined inside air temperature Tr1. That is, until the inside air temperature Tr is reduced to the second predetermined inside air temperature Tr2 that is lower than the first predetermined inside air temperature Tr1, the compression capacity (rotation speed) of the compressor 2 is not reduced so as to correspond to the heat load due to the battery cooling. Thereafter, the compression capacity of the compressor 2 is reduced.

According to the second embodiment, when the air amount of the battery cooling fan 42 is increased after the cool-down request is canceled, it can restrict the inside air temperature Tr is increased again immediately after the cool-down operation. Therefore, the inside air temperature Tr and the compressor 2 can be stably controlled.

(Third Embodiment)

Figure 13:
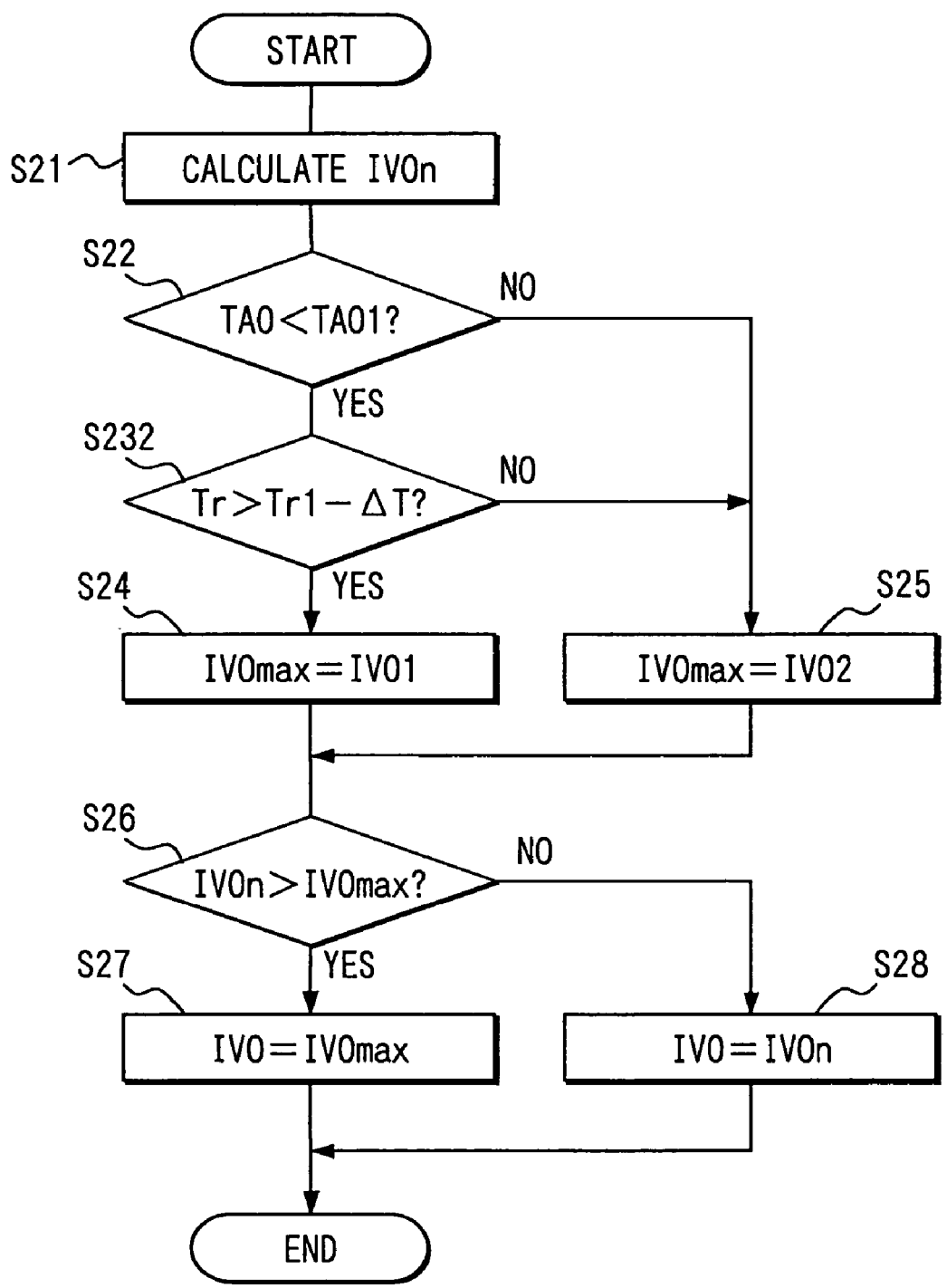
FIG. 13 is a flow diagram showing an electrical compressor control according to a third embodiment of the present invention.

The third embodiment of the present invention will be now described with reference to FIG. 13. In the third embodiment, step S231 of the second embodiment shown in FIG. 12 is changed to step S232 in FIG. 13. In the third embodiment, the other parts are the same as that described in the second embodiment.

In the third embodiment, at step S232, when the inside air temperature Tr is reduced by a predetermined temperature $\Delta T$ from the first predetermined inside air temperature Tr1 at step S232, the upper limit rotation speed of the compressor 2 is reduced at step S25 so that the cooling capacity of the compressor 2 is reduced.

According to the third embodiment, even when the inside air temperature Tr is equal to or lower than the first predetermined inside air temperature Tr1, the upper limit rotation speed is not reduced to the second predetermined valve IVO2. When the inside air temperature Tr is further reduced by the predetermined temperature $\Delta Tr$ from the first predetermined inside air temperature Tr1 at step S232, the upper limit rotation speed is reduced to the second predetermined valve IVO2 so that the compression capacity of the compressor 2 is reduced and the cooling capacity of the evaporator 9 is reduced.

Accordingly, even when the air blowing amount to the battery 50 is increased in the predetermined condition where the inside air temperature Tr is equal to or lower than the first predetermined inside air temperature Tr1, the upper limit rotation speed is not reduced to the second predetermined valve IVO2 until the inside air temperature Tr is further reduced by the predetermined temperature $\Delta Tr$ from the first predetermined inside air temperature Tr1. That is, until the inside air temperature Tr is reduced to a temperature (Tr−$\Delta Tr$), the compression capacity (rotation speed) of the compressor 2 is not reduced so as to correspond to the heat load due to the battery cooling. Thereafter, the compression capacity of the compressor 2 is reduced.

According to the third embodiment, when the air amount of the battery cooling fan 42 is increased after the cool-down request is canceled, it can restrict the inside air temperature Tr is increased again immediately after the cool-down operation. Therefore, the inside air temperature Tr and the compressor 2 can be stably controlled.

(Fourth Embodiment)

Figure 14:
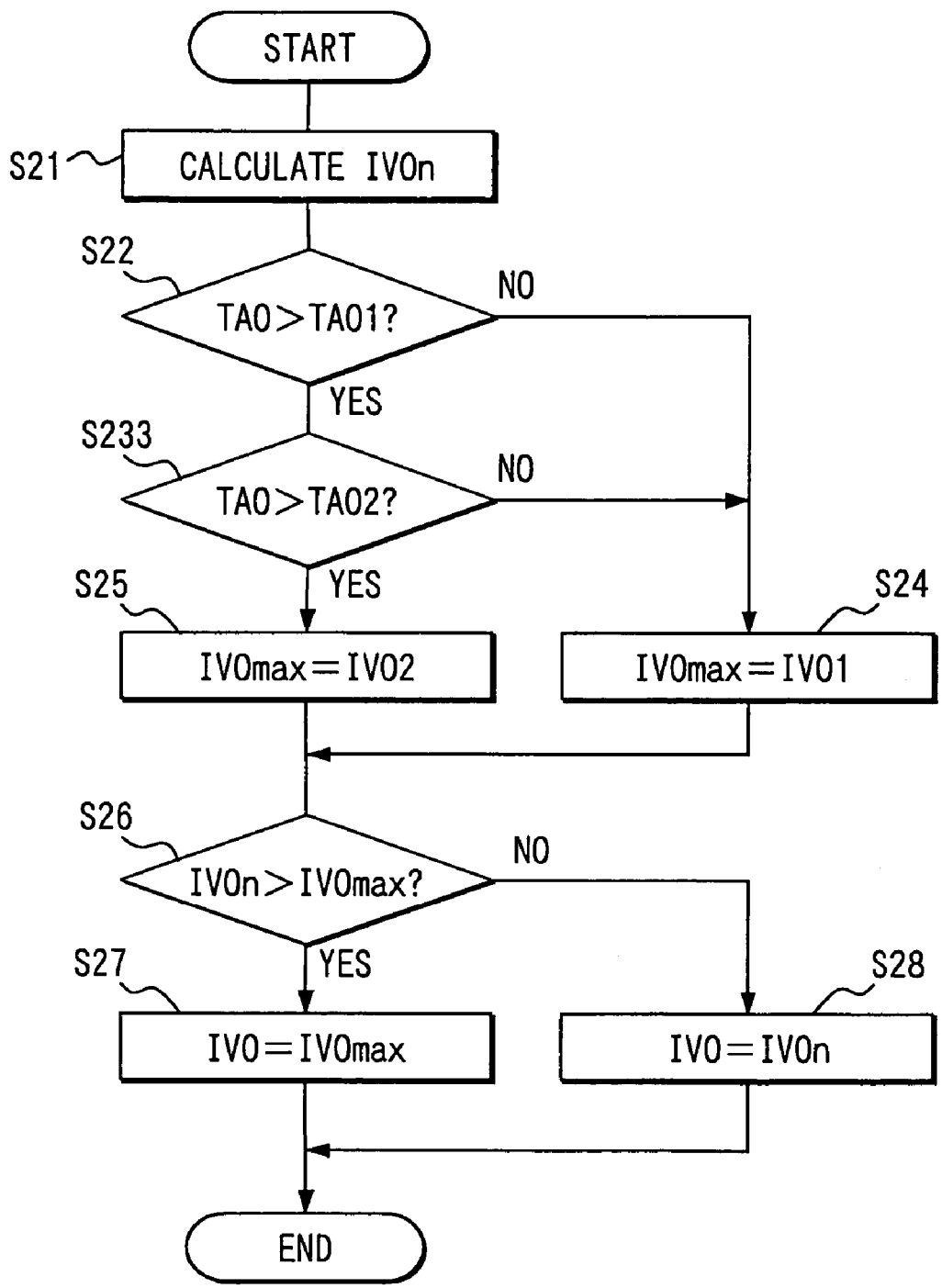
FIG. 14 is a flow diagram showing an electrical compressor control according to a fourth embodiment of the present invention.

The fourth embodiment of the present invention will be now described with reference to FIG. 14. In the fourth embodiment, step S231 of the second embodiment shown in FIG. 12 is changed to step S233 in FIG. 14. In the fourth embodiment, the other parts are the same as that described in the second embodiment.

As described in the first embodiment, when the target temperature TAO of air to be blown into the passenger compartment is higher than the first predetermined target temperature TAO1, the battery-cooling reducing request is canceled, and cooling air (inside air) is blown to the battery 50. That is, when a predetermined condition where the target temperature TAO is higher than the first predetermined target temperature TAO1 is satisfied, the battery-cooling reducing request is not performed. In this case, in the fourth embodiment, at step S233 of FIG. 14, it is determined whether or not the target temperature TAO is higher than a second predetermined target temperature TAO2 that is higher than the first predetermined target temperature TAO1. When the target temperature TAO is higher than the second predetermined target temperature TAO2 that is higher than the first predetermined target temperature TAO1, the upper limit rotation speed of the compressor 2 is reduced at step S25 so that the cooling capacity of the compressor 2 is reduced.

According to the fourth embodiment, even when the target temperature TAO is higher than the first predetermined target temperature TAO1, the upper limit rotation speed is not reduced to the second predetermined valve IVO2. When the target temperature TAO is higher than the second predetermined target temperature TAO2 that is higher than the first predetermined target temperature TAO1 at step S233, the upper limit rotation speed is reduced to the second predetermined valve IVO2 so that the compression capacity of the compressor 2 is reduced and the cooling capacity is reduced.

Accordingly, even when the air blowing amount to the battery 50 is increased in the predetermined condition where the target temperature TAO is higher than the first predetermined target temperature TAO1, the upper limit rotation speed is not reduced to the second predetermined valve IVO2 until the target temperature TAO is higher than the second predetermined target temperature TAO2. That is, until the target temperature TAO is higher than the second predetermined target temperature TAO2, the rotation speed of the compressor 2 is not reduced so as to correspond to the heat load due to the battery cooling. Thereafter, the rotation speed of the compressor 2 is reduced.

According to the fourth embodiment, when the air amount of the battery cooling fan 42 is increased after the cool-down request is canceled, it can restrict the inside air temperature Tr is increased again immediately after the cool-down operation. Therefore, the inside air temperature Tr and the compressor 2 can be stably controlled.

(Fifth Embodiment)

Figure 15:
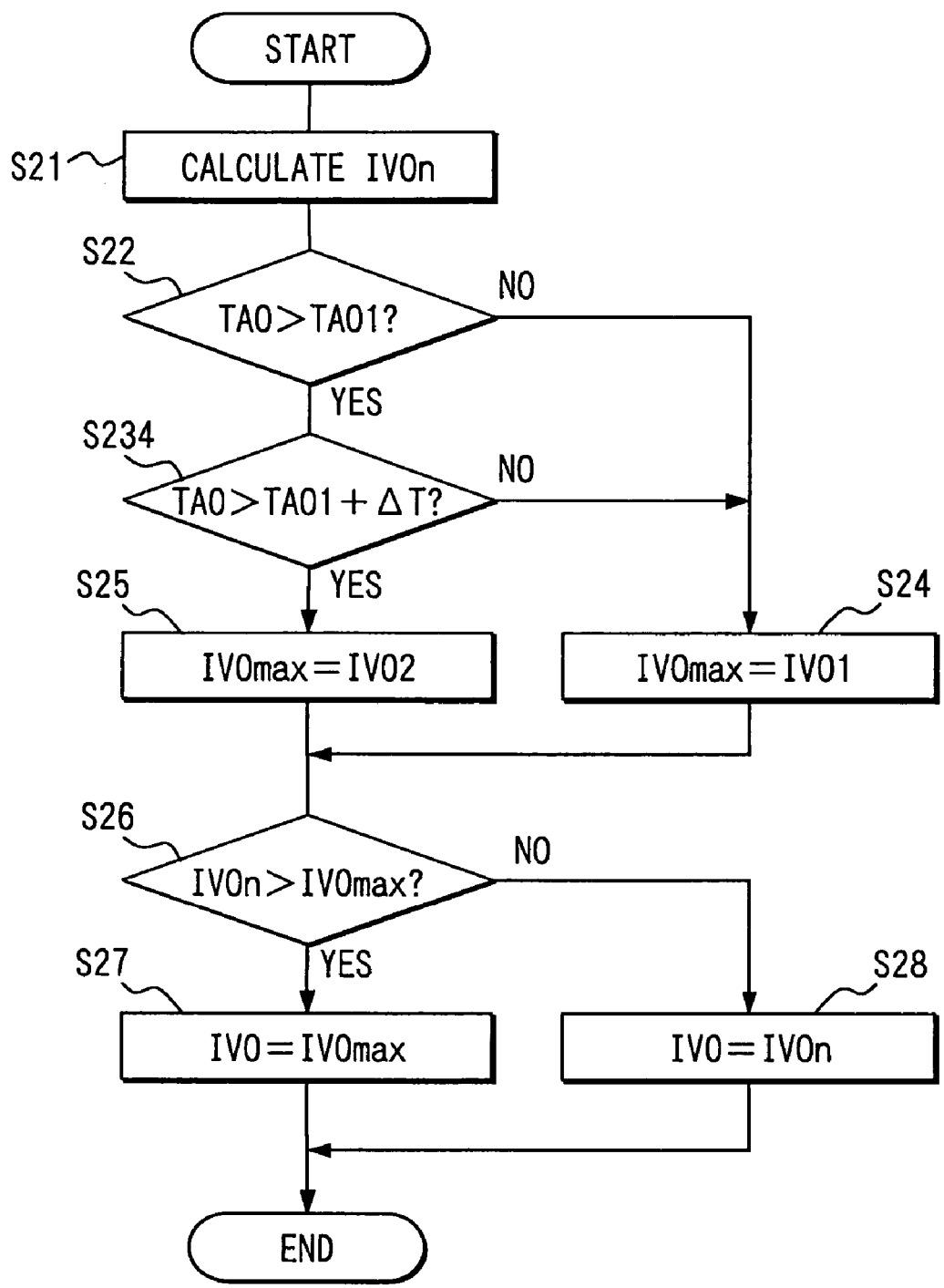
FIG. 15 is a flow diagram showing an electrical compressor control according to a fifth embodiment of the present invention.
Figure 16:
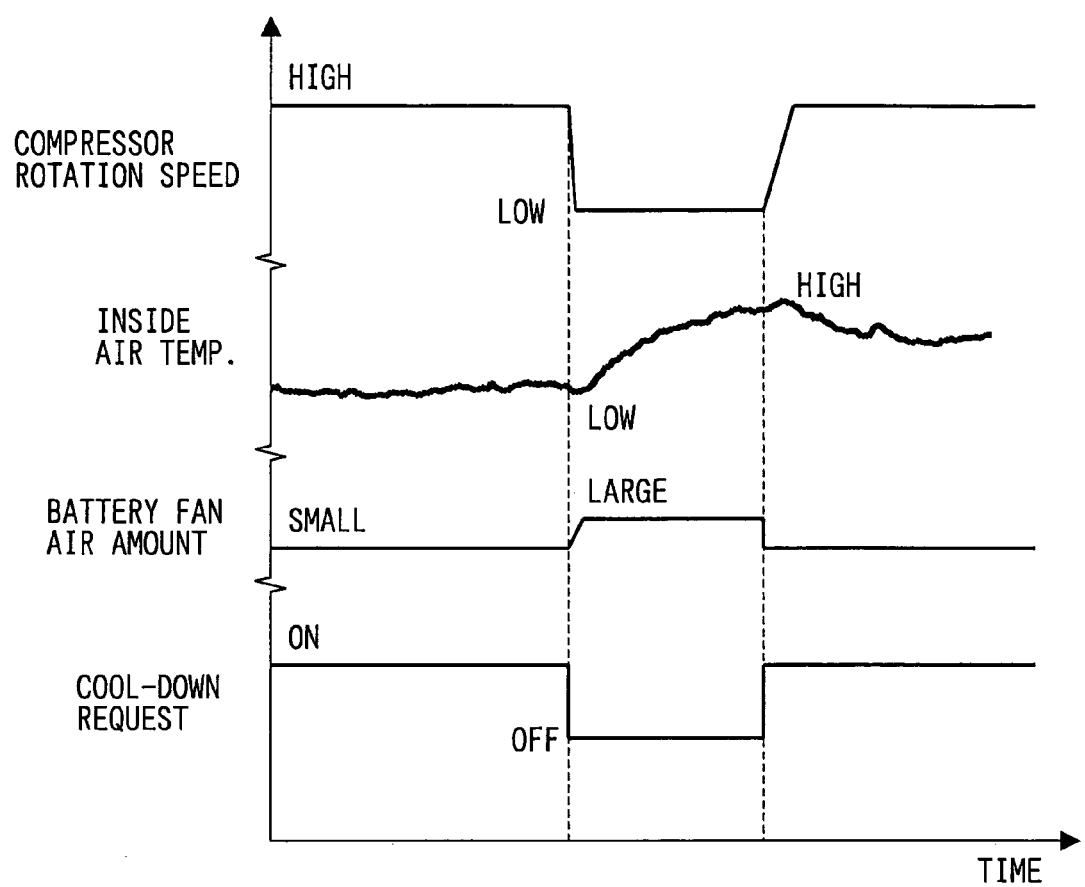
FIG. 16 is a time chart for explaining problems in a prior art.

The fifth embodiment of the present invention will be now described with reference to FIG. 15. In the fifth embodiment, step S231 of the second embodiment shown in FIG. 12 is changed to step S234 in FIG. 15, similarly to the above-described fifth embodiment. In the fifth embodiment, the other parts are the same as that described in the second embodiment.

As described in the first embodiment, when the target temperature TAO is higher than the first predetermined target temperature TAO1, the battery-cooling reducing request is canceled, and cooling air (inside air) is blown to the battery 50. That is, when the predetermined condition where the target temperature TAO is higher than the first predetermined target temperature TAO1 is satisfied, the battery-cooling reducing request is not output. In this case, in the fifth embodiment, at step S234 of FIG. 15, it is determined whether or not the target temperature TAO is increased by a predetermined temperature ΔT from the first predetermined target temperature TAO1. When the target temperature TAO is increased by the predetermined temperature ΔT from the first predetermined target temperature TAO1, the upper limit rotation speed of the compressor 2 is reduced at step S25 so that the cooling capacity of the compressor 2 is reduced.

According to the fifth embodiment, even when the target temperature TAO is higher than the first predetermined target temperature TAO1, the upper limit rotation speed of the electrical compressor 2 is not reduced to the second predetermined valve IVO2. When the target temperature TAO is increased by the predetermined temperature ΔT from the first predetermined target temperature TAO1 at step S234, the upper limit rotation speed of the electrical compressor 2 is reduced to the second predetermined valve IVO2 so that the compression capacity of the compressor 2 is reduced and the cooling capacity of the evaporator 9 is reduced.

Accordingly, even when the air blowing amount to the battery 50 is increased in the predetermined condition where the target temperature TAO is higher than the first predetermined target temperature TAO1, the upper limit rotation speed is not reduced to the second predetermined valve IVO2 until the target temperature TAO is increased by the predetermined temperature ΔT from the first predetermined target temperature TAO1. That is, until the target temperature TAO is increased by the predetermined temperature ΔT from the first predetermined target temperature TAO1, the rotation speed of the compressor 2 is not reduced so as to correspond to the heat load due to the battery cooling. Thereafter, the rotation speed of the compressor 2 is reduced.

According to the fifth embodiment, when the air amount of the battery cooling fan 42 is increased after the cool-down request is canceled, it can restrict the inside air temperature Tr is increased again immediately after the cool-down operation. Therefore, the inside air temperature Tr and the compressor 2 can be stably controlled.

(Other Embodiment)

Although the present invention has been fully described in connection with the preferred embodiments thereof with reference to the accompanying drawings, it is to be noted that various changes and modifications will become apparent to those skilled in the art.

For example, in the above-described embodiments, the compression capacity (rotation speed) of the compressor 2 is changed by changing the rotation speed of the electrical motor 3, so that the cooling capacity of the evaporator 9 for cooling the passenger compartment is controlled. However, a variable displacement compressor can be used as the compressor 2. In this case, the cooling capacity can be controlled by controlling the discharge capacity of the variable displacement compressor.

In the above-described embodiments, both the cool air circulation duct 41b and the cool air discharge duct 41c are provided in the battery cooling system 40, as shown in FIG. 1. However, at least one of the cool air circulation duct 41b and the cool air discharge duct 41c can be provided in the battery cooling system 40.

Further, in the above-described first embodiment of the present invention, when the predetermined condition is satisfied, the air amount blown to the battery 50 is increased, and the compression capacity of the electrical compressor 2 is reduced after the predetermined time t1 passes after the predetermined condition is satisfied. However, the compression capacity of the electrical compressor 2 can be reduced after the air amount blown to the battery 50 is increased to a predetermined amount (e.g., maximum amount) when the predetermined condition is satisfied. Such changes and modifications are to be understood as being within the scope of the present invention as defined by the appended claims.

What is claimed is:

1. A battery cooling system for cooling a battery mounted on a vehicle by using conditioned air of an air conditioner, the air conditioner comprising:

a compression device for compressing refrigerant, the compression device disposed to control a compression capacity;

an air conditioning case for defining an air passage through which air flows, the air conditioning case having an air outlet portion from which air is blown into a passenger compartment of the vehicle;

a cooling heat exchanger for cooling air by using refrigerant from the compression device, the cooling heat exchanger being disposed in the air conditioning case upstream from the air outlet portion; and an air-conditioning control unit which controls a cooling capacity of the cooling heat exchanger by controlling a compression capacity of the compression device, the battery cooling system comprising:

a battery case for accommodating the battery, the battery case having an air supply passage through which air inside the passenger compartment is introduced to be supplied to the battery;

a blower disposed in the battery case for blowing air introduced into the air supply passage to the battery; and a battery control unit which controls the blower to increase an air amount supplied to the battery when a predetermined condition is satisfied, wherein the air-conditioning control unit decreases the compression capacity of the compression device after the air amount supplied to the air supply passage of the battery case is increased to a predetermined amount.

2. The battery cooling system according to claim 1, wherein the battery case includes at least one of an air circulation passage through which air after cooling the battery returns to the passenger compartment, and an air discharge passage through which air after cooling the battery is discharged outside of the passenger compartment.

3. The battery cooling system according to claim 1, wherein the air-conditioning control unit decreases the compression capacity of the compression device after a predetermined time passes after the air amount supplied to the air supply passage of the battery case is increased to the predetermined amount.

4. The battery cooling system according to claim 1, wherein:

the air conditioner includes an inside air temperature detecting unit for detecting a temperature inside the passenger compartment;

the predetermined condition is satisfied when the temperature detected by the inside air temperature detecting unit is lower than a first predetermined temperature; and the air-conditioning control unit decreases the compression capacity of the compression device when the temperature detected by the inside air temperature detecting unit becomes lower than a second predetermined temperature that is lower than the first predetermined temperature.

5. The battery cooling system according to claim 4, wherein the battery control unit controls the blower to decrease the air amount supplied to the battery when the temperature detected by the inside air temperature detecting unit is higher than the first predetermined temperature.

6. The battery cooling system according to claim 1, wherein:

the air-conditioning control unit includes a target temperature calculation means for calculating a target temperature of air to be blown into the passenger compartment;

the predetermined condition is satisfied when the target temperature calculated by the target temperature calculation means is higher than a first predetermined temperature; and the air-conditioning control unit decreases the compression capacity of the compression device when the calculated target temperature is higher than a second predetermined temperature that is higher than the first predetermined temperature.

7. The battery cooling system according to claim 6, wherein the battery control unit controls the blower to decrease the air amount supplied to the battery when the calculated target temperature is lower than the first predetermined temperature.

8. A vehicle apparatus comprising:

an air conditioner for performing air conditioning of a passenger compartment of the vehicle, the air conditioner including a compression device for compressing refrigerant, the compression device disposed to control a compression capacity, a refrigerant radiator for cooling the refrigerant discharged from the compressor, a decompression device for decompressing refrigerant from the refrigerant radiator, an air conditioning case for defining an air passage through which air flows, the air conditioning case having an air outlet portion from which air is blown into the passenger compartment of the vehicle, a cooling heat exchanger for cooling air by using refrigerant from the decompression device, the cooling heat exchanger being disposed in the air conditioning case upstream from the air outlet portion, and an air-conditioning control unit which controls a cooling capacity of the cooling heat exchanger by controlling a compression capacity of the compression device; and the battery cooling system for cooling a battery mounted on the vehicle, the battery cooling system including a battery case for accommodating the battery, the battery case having an air supply passage through which air inside the passenger compartment is introduced to be supplied to the battery, a blower disposed in the battery case for blowing air introduced into the air supply passage to the battery, and a battery control unit which controls the blower to increase an air amount supplied to the battery when a predetermined condition is satisfied, wherein the air-conditioning control unit decreases the compression capacity of the compression device after the air amount supplied to the air supply passage of the battery case is increased to a predetermined amount.

9. The vehicle apparatus according to claim 8, wherein the battery case includes at least one of an air circulation passage through which air after cooling the battery returns to the passenger compartment, and an air discharge passage through which air after cooling the battery is discharged outside of the passenger compartment.

10. The vehicle apparatus according to claim 8, wherein the air-conditioning control unit decreases the compression capacity of the compression device after a predetermined time passes after the air amount supplied to the air supply passage of the battery case is increased to the predetermined amount.

11. The vehicle apparatus according to claim 8, wherein:

the air conditioner includes an inside air temperature detecting unit for detecting a temperature inside the passenger compartment;

the predetermined condition is satisfied when the temperature detected by the inside air temperature detecting unit is lower than a first predetermined temperature; and the air-conditioning control unit decreases the compression capacity of the compression device when the temperature detected by the inside air temperature detecting unit becomes lower than a second predetermined temperature that is lower than the first predetermined temperature.

12. The vehicle apparatus according to claim 8, wherein:

the air-conditioning control unit includes a target temperature calculation means for calculating a target temperature of air to be blown into the passenger compartment;

the predetermined condition is satisfied when the target temperature calculated by the target temperature calculation means is higher than a first predetermined temperature; and the air-conditioning control unit decreases the compression capacity of the compression device when the calculated target temperature is higher than a second predetermined temperature that is higher than the first predetermined temperature.

13. The vehicle apparatus according to claim 8, wherein:

the air conditioner includes an inside air temperature detecting unit for detecting a temperature inside the passenger compartment;

the air-conditioning control unit includes a target temperature calculation means for calculating a target temperature of air to be blown into the passenger compartment;

the predetermined condition is satisfied when the temperature detected by the inside air temperature detecting unit is lower than a first predetermined inside air temperature or when the calculated target temperature is higher than a first predetermined target temperature; and the air-conditioning control unit decreases the compression capacity of the compression device when the temperature detected by the inside air temperature detecting unit becomes lower than a second predetermined inside air temperature that is lower than the first predetermined inside air temperature, or when the calculated target temperature is higher than a second predetermined target temperature that is higher than the first predetermined target temperature.

14. The vehicle apparatus according to claim 13, wherein the battery control unit controls the blower to decrease the air amount supplied to the battery when the temperature detected by the inside air temperature detecting unit is higher than the first predetermined inside air temperature or when the calculated target temperature is lower than the first predetermined target temperature.

15. The vehicle apparatus according to claim 8, wherein the battery is used as a driving source of an electrical motor that is operated for a vehicle traveling.

* * * * *